United States Patent
Leitner

(10) Patent No.: US 10,355,961 B2
(45) Date of Patent: Jul. 16, 2019

(54) NETWORK TRAFFIC CAPTURE ANALYSIS

(71) Applicant: Red Hat, Inc., Raleigh, NC (US)

(72) Inventor: Marcelo Ricardo Leitner, Curitiba (BR)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/054,296

(22) Filed: Aug. 3, 2018

(65) Prior Publication Data

US 2018/0343182 A1 Nov. 29, 2018

Related U.S. Application Data

(63) Continuation of application No. 15/055,974, filed on Feb. 29, 2016, now Pat. No. 10,063,444.

(51) Int. Cl.
*H04L 12/26* (2006.01)
*H04L 29/12* (2006.01)

(52) U.S. Cl.
CPC .......... *H04L 43/0894* (2013.01); *H04L 43/10* (2013.01); *H04L 43/16* (2013.01); *H04L 43/18* (2013.01); *H04L 61/2007* (2013.01); *H04L 43/12* (2013.01); *H04L 61/6063* (2013.01)

(58) Field of Classification Search
CPC . H04L 43/0894; H04L 43/10; H04L 61/2007; H04L 61/6063; H04L 43/16; H04L 43/18; H04L 43/12
See application file for complete search history.

(56) References Cited

U.S. PATENT DOCUMENTS

| | | | |
|---|---|---|---|
| 7,062,680 B2 | 6/2006 | Sirbu | |
| 7,493,659 B1 | 2/2009 | Wu et al. | |
| 9,054,965 B2 | 6/2015 | Malloy et al. | |
| 9,106,682 B2 | 8/2015 | Foley et al. | |
| 9,110,101 B2 | 8/2015 | Pietrowicz et al. | |
| 9,189,317 B1 | 11/2015 | Marimuthu | |
| 10,063,444 B2* | 8/2018 | Leitner | H04L 43/0894 |
| 2003/0084318 A1 | 5/2003 | Schertz | |
| 2006/0026681 A1 | 2/2006 | Zakas | |
| 2011/0125748 A1 | 5/2011 | Wood et al. | |
| 2015/0288594 A1 | 10/2015 | Yin | |

OTHER PUBLICATIONS

"Caesar0301/Asesome-Pcaptools", github.com, Dec. 22, 2015, 7 pages, https://github.com/caesar0301/awesome-pcaptools.

(Continued)

*Primary Examiner* — Melvin C Marcelo
(74) *Attorney, Agent, or Firm* — Lowenstein Sandler LLP

(57) ABSTRACT

A an example method of network traffic capture analysis includes: receiving a plurality of data items, wherein each data item of the plurality of data items comprises at least part of a network packet captured at a network access point; determining a packet retransmission rate in view of a number of groups of data items representing network packets having a common sequence number, a common source network address, and a common destination network address; and causing a notification indicative of the packet retransmission rate to be presented via a graphical user interface (GUI).

20 Claims, 4 Drawing Sheets

(56) References Cited

OTHER PUBLICATIONS

Kato, Akira, et al., "An Internet Traffic Data Repository: The Architecture and the Design Policy", isoc.org, 9 pages https://www.isoc.org/inet99/proceedings/4h/4h_1.htm (Last accessed Feb. 9, 2016).

Tabona, Andrew, "The Top 20 Free Network Monitoring and Analysis Tools for Sys Admins", gfi.com, May 15, 2015, 17 pages, http://www.gfi.com/blog/the-top-20-free-network-monitoring-and-analysis-tools-for-sys-admins/.

"Tools", wiki.wireshark.org, Feb. 1, 2016, 6 pages, https://wiki.wireshark.org/Tools.

USPTO, Office Action for U.S. Appl. No. 15/055,974, dated Dec. 27, 2017.

USPTO, Notice of Allowance for U.S. Appl. No. 15/055,974, dated May 1, 2018.

\* cited by examiner

| No. | Time | Source | Destination | Protocol | Information |
|---|---|---|---|---|---|
| 1 | 1.259 | 192.168.0.1 | 235.168.0.2 | TCP | http>3197 |
| 2 | 1.266 | 192.168.0.1 | 235.168.0.2 | TCP | 1025>5000 [PSH ACK] Seq=1 |
| 3 | 1.267 | 192.168.0.1 | 235.168.0.2 | TCP | 5000>1025 [PSH ACK] Seq=1 |
| 4 | 1.268 | 192.168.0.2 | 235.168.0.2 | TCP | 1025>5000 [ACK] seq=510 ack=20 |

FIG. 2

NETWORK TRAFFIC CAPTURE ANALYSIS

RELATED APPLICATIONS

This application is a continuation of U.S. patent application Ser. No. 15/055,974 filed on Feb. 29, 2016, the entire content of which is incorporated by reference herein.

TECHNICAL FIELD

This disclosure relates to network traffic analysis, and in particular, to analyzing packet information captured at network access points and providing technical solutions to network performance issues identified from the captured packet information.

BACKGROUND

Users of computer systems often encounter network performance issues including, for example, unreachable website, slow connection, and network misconfiguration. The network (e.g., the Internet) may be associated with multiple network nodes that communicate with each other by exchanging packets. Network nodes may include hardware devices connected to the network and communicate via the network. A packet is a formatted data unit including a header and a payload, whereas the header may contain control data pertaining to routing the packet and the payload may contain the data content carried in the packet. A network node may include network devices (e.g., computer, switch, or gateway) to facilitate the exchange of packets with other network nodes. These network devices are referred to as network access point herein. Certain software tools may allow a user to capture packet information pertaining to the packets transmitted through a network access point.

BRIEF DESCRIPTION OF THE DRAWINGS

The present disclosure is illustrated by way of example, and not by way of limitation, in the figures of the accompanying drawings.

FIG. 2 illustrates a portion of network traffic captures file according to an implementation of the present disclosure.

DETAILED DESCRIPTION

Figure 1:
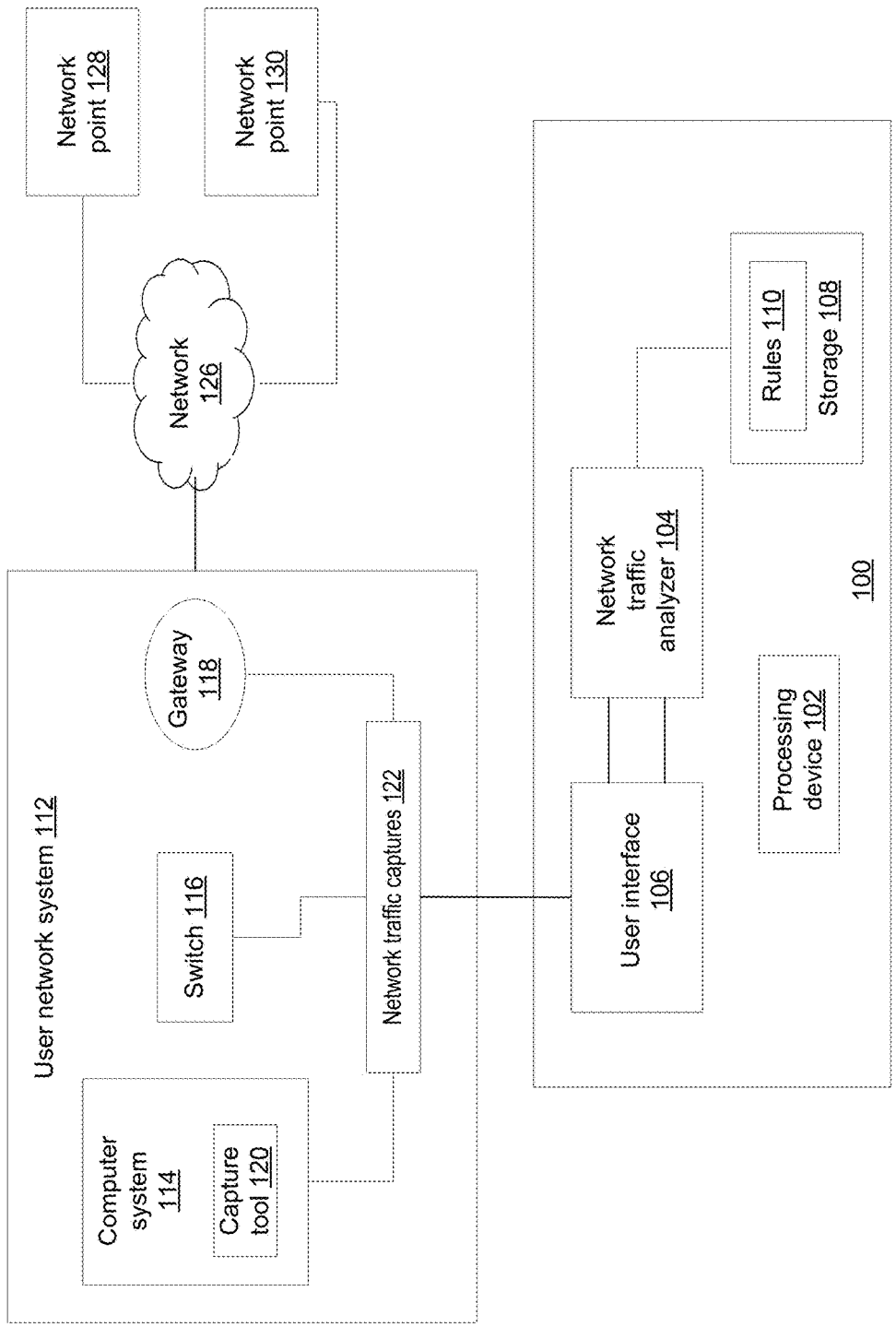
FIG. 1 illustrates a system 100 including a network traffic analyzer according to an implementation of the present disclosure.

Since the users of the computer systems commonly do not possess the requisite knowledge to analyze the captured packet information, a networking expert may need to intervene to determine the network performance issues. Implementations of the present disclosure include systems and methods that provide diagnosis and technical solutions to the users who encounter network performance issues.

Data communication systems may be implemented on a packet-switched network according to a layered model (such as Open System Interconnect (OSI) layered model). The communication among the network nodes connected to the network may be described using a model having seven layers including a physical layer (OSI layer 1), a data link layer (OSI layer 2), a network layer (OSI layer 3), a transport layer (OSI layer 4), a session layer (OSI layer 5), a presentation layer (OSI layer 6), and an application layer (OSI layer 7). Each layer may be specified according to certain protocols to perform certain networking functionality. A layer interacts directly with the layer immediately beneath it (e.g., OSI layer 6 interacts with OSI layer 5) and provides facility to the functionality of the layer above (e.g., Layer 6 provides facility to OSI layer 7).

Under the above OSI layered mode, the physical layer may transmit and receive raw bit streams over a physical medium (e.g., wired or wireless transmission medium). The data link layer may perform reliable transmission of data frames between two network nodes over the physical layer. A frame is a digital data transmission unit containing a first sequence of bits (or symbols) indicating the beginning and end of the data content and a second sequence of bits representing the data. The network layer may provide protocols and functionalities to manage a multi-node network, including addressing, routing, and controlling traffic of packets. A packet is a formatted data unit including a header and a payload, whereas the header may contain control data pertaining to routing the packet (e.g., source IP address, destination IP address, protocol, and packet sequencing number within a session etc.) and the payload may contain the data content (in bits) carried by the packet.

The transport layer above the network layer may optionally divide packets into smaller units (a process referred to as data segmentation) for reliable transmission between network nodes according to a protocol (e.g., transport control protocol (TCP)). The data segmentation is used when a packet is larger than the maximum size of a data unit supported by a network.

The session layer above the transport layer may manage communication sessions between two network nodes. A communication session is the continuous exchange of information in the form of packet back-and-forth between the two network nodes to perform a networking task. For example, a first network node and a second network node may use a handshake session to establish a communication channel between the two network nodes. The first network node may send a packet with a flag of "SYN" to the second network node, indicating the request to initiate a communication channel. The second network node may send a packet with a flag of "SYN, ACK" to the first network node, indicating the acknowledgement. The time passed between the first node sending out "SYN" and receiving the "SYN, ACK" is commonly referred to as round-trip time (RTT). The first network node may then send a packet with a flag of "ACK" to the second network node, indicating that the establishment of the communication channel between the network nodes. After the successful handshake, the first network node may transmit data (in packets) to the second network node in a session.

The presentation layer may translate data from the application layer to formats that are suitable for network services. For example, the translation may perform character encoding, data compression, and data encryption and decryption. The application layer may include high-level interfaces (e.g., APIs) for resource sharing, remote file access, directory services, and virtual terminals.

A user of a network-enabled user system may use a software application (e.g., a web browser or an e-mail program) via the application layer to perform tasks requiring network services. The execution of the software application may encounter certain network performance issues such as, for example, unreachable website, slow connection, and network misconfiguration. The cause of these issues may not be readily apparent to the user. Thus, the user may need helps with diagnosis and solutions to the encountered network performance issues.

Implementations of the present disclosure include a network traffic analyzer that may receive, via a user interface, packet information recorded at a network access point and environmental parameters associated with the computing environment under which the network access point operates. The network access point can be a computer system (such as, a host computer, a server computer, or a client computer) or a network interface point (such as, a network interface card, a switch, or a gateway) associated with a network node (e.g., an enterprise private network). The environmental parameters can be an identifier indicating the operating system associated with the network access point. The packet information might have been captured using a packet sniffing tool such as, for example, tcpdump or WireShark®. The packet information includes parameters relating to packets described in conjunction with the network layer above. The parameters associated with layers above the network layer may be derived from the packet information.

The packet information may be recoded at the network access point as line data items, either in binary or in ASCII, in a file (referred to as network traffic captures file). Each line data item may contain information corresponding to a packet, including a set of parameters associated with the packet. The network traffic analyzer may scan, line by line, these line data items to identify parameter patterns that may provide evidence relating to causes to network performance issues. The identification of the parameters patterns may be carried out according to rules stored in a storage device. Responsive to identifying a parameter pattern matching the cause of a certain network performance issue, the network traffic analyzer may identify solutions to the issue, and cause to present a first message indicating the identified cause and a second message indicating the identified solutions on a user interface. The user can then act according to the suggested solutions. Thus, the user may resolve certain network problems with less or no intervention from a network technician.

FIG. 1 illustrates a system 100 including a network traffic analyzer 104 according to an implementation of the present disclosure. As shown in FIG. 1, a user may have access to a networked user network system 112 that is connected via a network 126 (e.g., the Internet) to certain network nodes (e.g., network nodes 128, 130). A network node may be a system associated with an Internet protocol (IP) address that is identifiable by network 126. Network 126 may be characterized according to the above-described layered networking model including a network layer for carrying packets specified according to networking protocols (e.g., Transmission Control Protocol/Internet Protocol (TCP/IP)). The network nodes may include, for example, enterprise private networks, computer systems, smart phones, thin clients, and different types of server computers. These packets may include a header and a payload, whereas the header may contain control data pertaining to source IP address, destination IP address, protocol, and packet sequencing number, and the payload may contain the content data to be transmitted from the source to the destination. Thus, the payload of a packet may be sent, routed, and received according to the control data in the header of the packet from a sender (e.g., network node 128) via network 126 to a receiver (e.g., network node 130).

User network system 112 is a network node connected to network 126 to communicate with other network nodes 128, 130 in order to perform certain network-related tasks such as, for example, web browsing and exchanging e-mails. These tasks are achieved by exchanging packets between user network system 112 and other network nodes 128, 130. In one implementation, user network system 112 may further include multiple network access points that are associated with transmitting packet. A network access point is a hardware device that receives and optionally, transmits packets. As shown in FIG. 1, user network system may include network access points such as, for example, computer system 114 for generating and receiving packets, switch 116 for forwarding packets, and gateway 118 for interfacing with network 126. For example, computer system 114 may execute an e-mail application for sending a message to an e-mail destination 130. Software applications specified in the application layer and the presentation layer may convert the data for the e-mail message into a number of packets and establish a communication session to send these packets through switch 116 and/or gateway 118 into network 126. The network 128 may further route these packets to the destination node 130 where the e-mail message may be reconstructed from these packets. Thus, the packet may pass each of the network access points (such as, computer system 114, switch 116, and gateway 118) in the user network system before entering network 126.

In one implementation, a network traffic capture tool 120 (e.g., a packet sniffer such as, tcpdump or WireShark®) may be installed on computer system 114 for capturing information (referred to as packet information) pertaining to the packets associated with a network access point into network traffic captures file 122 stored in a storage device (e.g., a hard-drive). Network traffic capture tool 120 can be a software application executed by a processing device of computer system 114. A user may specify (e.g., through assigning option values in tcpdump) which the network access point to capture packet information and the parameters contained in the packet information.

In one implementation, the captured packet information may be stored as line data items in network traffic captures file 122, where each line data item contains information relating to one packet captured at the network access point. A line data item may include an index number for the line, a time stamp in seconds indicating the packet capture time, a source IP address indicating the originating network node of the packet, a destination IP address indicating the receiving network node of the packet, a protocol parameter indicating the protocol associated with the packet transmission, and protocol-specific detailed information including, for example, a function flag parameter indicating a function of the packet. The function flag parameter may include values of ACK (Acknowledge), SYN (Synchronized), FIN (Finish), RST (Reset), PSH (Push), URG (Urgent) etc. The detailed information may also include a source port number associated with the source IP address and a destination port number associated with the destination IP address. These port numbers are Internet socket port numbers used by the transport layer to establish point-to-point connectivity. For example, port number 80 may indicate that the packet session is for Hypertext Transfer Protocol (HTTP) service. The detailed information may also include a sequence number (and/or an acknowledgement number) to indicate the order of packets within a session. The sequence number may represent an ordinal number of the starting data byte of the payload of the packet within a current OSI layer 4 (transport layer) session.

The network traffic capture tool 120 may also capture the header of the packet and optionally, a portion of the payload of the packet. Thus, network traffic captures file 122 may contain multiple line data items of packet information corresponding to multiple packets passed through the network access point over a period of time.

In one implementation, responsive to encountering a network performance issue, a user may run the network traffic capture tool 120 to capture the packet information at a network access point into the network traffic captures file 122 over a period of time. The network traffic captures file 122 and parameters indicating the computing environment (e.g., the operating system) associated with the network access point may be submitted to a network traffic analysis system 100 for trouble shooting.

In one implementation, network traffic analysis system 100 may be a computing device separate from computer system 114. In another implementation, network traffic analysis system 100 may be part of computer system 114. As shown in FIG. 1, network traffic analysis system 100 may include a processing device 102 (such as, a central processing unit (CPU)) to execute a network traffic analyzer 104. Network traffic analysis system 100 may also include a storage device 108 to store rules 110 that may be used to identify parameter patterns pertaining to causes of network performance issues.

In one implementation, network traffic analyzer 104 is a software application that may receive, via user interface 106, network traffic captures file 122 and computing environmental parameters associated with the network access point at which the packet information is captured. The network traffic analyzer 104 may scan the line data items in the network traffic captures file 122 to identify parameter patterns that indicate causes of network performance issues. The identification may be made in view of the environmental parameters and pre-defined rules 110 stored in storage device 108. Responsive to identifying a parameter pattern associated with causes of network performance issues, the network traffic analyzer 104 may search for solutions to these causes, and cause to present, on user interface 106, messages indicating these causes and associated solutions on user interface 106 for the user.

FIG. 2 illustrates a portion of network traffic captures file 200 according to an implementation of the present disclosure. As shown in FIG. 2, each line data item of network traffic captures file 200 may contain parameters associated with a packet identified by an index number 202. The parameters in each line data item may include a time parameter 204 indicating packet capture time, a source IP address 206 identifying a network node sending the packet, a destination IP address 208 identifying a network node receiving the packet, a protocol parameter 210 identifying the protocol associated with the packet, and detailed packet-specific information field 212 containing further information about the packet. Under the TCP/IP protocol, the detailed information 210 may contain a function flag having value (e.g., ACK, FIN, RST, PSH, URG etc.) to indicate the function of the packet in a session, a source port number, a destination port number, a sequence number (seq=#) indicating an ordinal number of the packet within the session, and payload length value (len=#) indicating the number of bits carried in the payload. Detailed information 212 may contain different sets of parameters for different packets, and the function flag values may also vary for different protocols.

A user may encounter different types of network performance issues while performing networking tasks using a user system, including, for example, an unreachable website from the user system, low network performance (e.g., slow or intermittent connection to the Internet), and unexpected responses. Implementations of the present disclosure include a network traffic analyzer to match the captured packet information to parameter patterns associated with causes of these issues.

In one implementation, a user may be unable to reach a website even if a correct web address (e.g., uniform resource locator (URL)) is entered in a web browser. The user may start the execution of a capture tool (e.g., the capture tool 120 as shown in FIG. 1) to capture packet information at a network access point (e.g., the user network system) into a network traffic captures file 122. The user may then submit network traffic captures file 122 via user interface 106 to a network traffic analyzer 104 to identify the cause and associated solutions. The user may also submit environmental parameters such as, for example, an identifier indicating the operating system via the user interface to the network traffic analyzer 104. In one implementation, the environmental parameters may be the version of an operating system in which computer system 114 operates (e.g., RHEL5, RHEL7 etc.). This information may help restrict the search for network performance issues relevant to a specific type of operating systems. In one implementation, the environmental parameters may include the information about the network interface card (NICs) that is used in user network system 112. For example, the NIC driver being used may be submitted to network traffic analyzer 104 along with network traffic captures file 122.

Responsive to receiving the network traffic captures file 122, network traffic analyzer 104 may scan, line by line, the line data items to identify parameter patterns associated with causes of these issues. The association between parameter patterns and causes of network performance issues are encoded in the as rules 110 as the steps performed in the following. For the unreachable website error, network traffic analyzer 104 may first identify all packets associated with a network layer protocol such as, for example, the TCP protocol. This may be carried out by identify all of those line data items that includes protocol parameter 210 having a value of "TCP." Network traffic analyzer 104 may determine a request packet by searching for a line data item including a function flag value of "SYN," and parameters indicating source IP address (src IP), source port number (src port), destination IP address (dst IP), and destination port number (dst port). Identification of these parameters associated with a packet indicates a request packet is sent to request a connection from a source network node to a destination network node.

Responsive to identifying the request packet, network traffic analyzer 104 may determine whether there is an acknowledgement packet received within a time limit (referred to as Retransmission Timeout (RTO)). The RTO may be set as a multiple of an ideal round-trip time (RTT) between the source node and the destination node. An ideal RTT is the time for a packet to travel a round trip between the source network node and destination network node under a normal network load (i.e., without stresses on the network). In one implementation, the RTO may be set at three times of the ideal RTT. If the source network node does not receive the acknowledge packet within the RTO time limit, the source network node may resend the same request packet with the "SYN" function flag to the destination network node. To this end, the source network node may maintain a timer to monitor the time that has been passed since the request packet is sent out and to determine whether to resend the request packet by comparing the time passed with the RTO time limit. In one implementation, each time a request packet is resent due to not receiving an acknowledge packet, the RTO associated with the packet may be increased (e.g., doubled) to provide more time for receiving the acknowledgement from the destination network node for the resent packet. Thus, the RTO for a first retransmission of a request packet may be increased to 6*RTT, and the RTO may be increased to 12*RTT for a second retransmission.

Network traffic analyzer 104 may try to identify the acknowledge packet sent from the destination network node. In one implementation, network traffic analyzer 104 may search for a second line data item including a source IP address matching the destination IP address of the request packet, a destination IP address matching the source IP address of the request packet, and a function flag of "ACK" in the received network traffic captures file 122.

In a first scenario, the network traffic analyzer 104 may determine that there is no acknowledge packet for the request packet (i.e., no second line data item that meets a source IP address, destination IP address, function flag requirements). Instead, the network traffic analyzer 104 may have identified multiple line data items including the same source IP address to the same destination IP address with function flag value of "SYN." These line data items correspond to the retransmission of request packets due to violating the RTO time limit. The network traffic analyzer 104 may determine that this parameter pattern indicates that the destination network node or a gateway along the way may have a connection problem. The network traffic analyzer 104 may present, via the user interface to the user, a first message indicating the cause (e.g., "provider connection unreachable") and a further technical suggestion that may lead to a technical solution (e.g., "please try tcptraceroute to pinpoint the problematic network point"). In one implementation, the network traffic analyzer 104 may also present a hyperlink to direct the user to a help page containing information tailored to the suggested technical solution.

In a second scenario, the network traffic analyzer 104 may determine that a second line data item including a source IP address matching the destination IP address contained in the first line data item. The network traffic analyzer 104 may further determine that the function flag in the detailed information in the second line data item has a value of "RST," indicating that the server providing the website received the request packet and responded with a denial. Network traffic analyzer 104 may determine that the server at the destination network node is running. Thus, Network traffic analyzer 104 may present, via the user interface, a first message indicating the cause (e.g., "provider denied the connection request") and a suggested technical solution (e.g., "please contact the website provider").

The network traffic analyzer 104 may also identify unexpected responses (e.g., from a local server rather than an intended external server) based on the round-trip time (RTT) associated with packets. The network traffic analyzer 104 may receive network traffic captures file 122 via user interface 106. The network traffic analyzer 104 may identify a request packet sent to a destination IP address associated with a destination port number=80 or 443, indicating that the packet is sent to an Hypertext Transfer Protocol (HTTP) destination server, and having a certain packet length (len>0) indicating a payload-carrying packet based on the parameter values in the associated line data item. The network traffic analyzer 104 may then identify an acknowledge packet that is sent from the destination server. For example, the network traffic analyzer 104 may search for a line data item containing a source IP address and a source port number that match the destination IP address and destination port number of the previously-identified request packet, and the line data item further contains a function flag value of "ACK" and a sequence number matching the previous request packet. This line data item represents the acknowledge packet sent by the HTTP destination server in response to receiving the request packet. The network traffic analyzer 104 may determine the RTT between the request packet and the acknowledge packet by calculating the time difference between the timestamps of the acknowledge packet and the request packet contained in their corresponding line data items. The network traffic analyzer 104 may then compare the calculated time difference to a threshold value. In one implementation, the threshold value can be a predetermine value (e.g., 2 milliseconds).

In another implementation, the threshold can be estimated using the smoothed RTT (SRTT) estimation. During real operation, the network load may vary due to many factors, and the observed real RTT for a packet to make round trip between a source network node and a destination network node may deviate from the ideal RTT. In some implementations, the ideal RTT may be estimated as a prediction from the real RTTs that between the source network node and the destination network node. In one implementation, the estimation of the ideal RTT can be a smoothed RTT (SRTT) that is calculated and updated recursively based on the latest observer RTT. Assuming that the RTT for an N-th packet is RTT(N) and the SRTT for previous N−1 packets is SRTT(N−1), the SRTT for the N packets may be estimated as $SRTT(N)=(1-\alpha)*SRTT(N-1)+\alpha*RTT(N)$, where $\alpha$ is a smooth factor (e.g., a is in a range between 0.8 to 0.9). Thus, the ideal RTT between a source network node can be estimated by recursively calculating the SRTT for each packet that has made a round trip between the source network node and the destination network node.

For example, the network traffic analyzer 104 may set an initial SRTT(0) value (e.g., 2 milliseconds) and keep updating the SRTT for each round-trip time for packets identified in the network traffic captures file 122 using $SRTT(N)=(1-\alpha)*SRTT(N-1)+\alpha*RTT(N)$, where network traffic analyzer 104 may set the smooth factor $\alpha$ to a real number in the range of 0.8 to 0.9. After updating the SRTT(N), network traffic analyzer 104 may set the threshold value to SRTT(N).

If the time difference is smaller than the threshold value, network traffic analyzer 104 may determine that the acknowledge packet is from somewhere in the local network rather than from an external network server. This may happen because the local network is misconfigured or is intentionally hijacking connections. The network traffic analyzer 104 may then present, via the user interface, a first message indicating the cause (e.g., "potential local network misconfiguration") and a suggested technical solution (e.g., "please contact the network team.").

To identify parameter patterns associated with the low-performance network issue due to packet losses and the subsequent retransmissions, network traffic analyzer 104 receive the network traffic captures file 122 and identify all packets associated with a certain protocol (e.g., TCP). Network traffic analyzer 104 may search for all line data items associated with the protocol (e.g., protocol="TCP"). For these TCP packets, the network traffic analyzer 104 may then identify those packets that have been exchanged between a source IP address (bound to a source port number) and a destination IP address (bound to a destination port number), and count the total number (N) of the TCP packets exchanged between the source IP address and the destination IP address. Network traffic analyzer 104 may then identify retransmitted TCP packets between the source IP address and the destination IP address because RTO time limit violations and calculate a packet retransmission rate for these PCT packets. The packet retransmission rate may be compared to a threshold to determine whether the network suffers packet loss and retransmission issues.

Network traffic analyzer 104 may determine whether a TCP packet is a retransmission based on timestamp, source IP address, destination IP address, sequence number (seq #), and payload length (len#) recorded in the line data item associated with the TCP packet. The timestamp recorded in the line data item associated with a TCP packet indicates the time that the TCP packet is captured at a network access point. The capture time may be with respect to a clock associated with the network access point. An earlier capture time indicates a TCP packet that was sent earlier.

The source IP address is associated with a source network node that sends the TCP packet, and the destination IP address is associated with a destination network node that receives the TCP packet. When a packet is sent from the source network node, the packet is associated with a sequence number (associated with the identifier of "seq") and a length number (associated with the identifier of "len"). The sequence number is an integer (e.g., 32-bit integer) that is used to keep track of how many bits of data (the payload of the packet) had been sent from the source network node to the destination network node within an OSI layer 4 session. Each packet that is transmitted from the source network node to the destination network node is associated with a sequence number that is recorded in the corresponding line data item. The initial packet (e.g., the first request packet) may be associated with a sequence number of zero (seq=0). Upon receiving a packet from the source network node with a payload (len=L), the destination network node may send an acknowledgement packet (with a function flag of "ACK") to the source network node with the sequence number and an acknowledgement number (associated with the identifier of "ack") indicating the number of bits (L) that the destination network node has received. Upon receiving the acknowledgement packet with the sequence number and the acknowledgement number, the source network node may know that the packet associated with the sequence number is transmitted successfully.

Thus, if a packet with sequence number N (seq=N) and a length number L (len=L) is sent from the source network node to the destination network node, the sequence number for the next packet is set to N+L. When an acknowledgement packet for the packet sent from the source network node is not received within the RTO, the source network node may retransmit the packet (seq=N, len=L) to the destination network node. The retransmitted packet may have a new timestamp, but the retransmitted packet may have same source IP address, same destination IP address, same sequence number (seq=N), and same payload (len=L) as the packet that has not been received by the destination network node. Thus, each packet to transmit a payload within a data transmission session may be uniquely identified by its sequence number. A retransmitted packet is a later captured packet that has the same source IP address, the same destination IP address, the same sequence number, and the same length number as a previously-captured packet.

Thus, network traffic analyzer 104 may use the information associated with packets to identify retransmitted packets and calculate a packet retransmission ratio from a source network node to a destination network node. In one implementation, with respect to a source network node (identified by the source IP address) and a destination network node (identified by the destination IP address), the network traffic analyzer 104 may determine a total number (PN) of packets that are transmitted from the source network node to the destination network node. Network traffic analyzer 104 may determine the total number (PN) by counting the line data items that include the source IP address and the destination IP address. Network traffic analyzer 104 may determine a total number (RPN) of retransmitted packet within the total number of packets transmitted from the source network node to the destination network node. To make the determination, the network traffic analyzer 104 may keep a counter. Thus, for each packet transmitted from the source network node to the destination network node associated with a timestamp and a sequence number, traffic analyzer 104 may identify a later packet (with a larger timestamp value) that is associated with the same sequence number, and increase the counter by one. Network traffic analyzer 104 may then determine the total number (RPN) of the retransmitted packets between the source network node and the destination network node by searching, line by line, through network traffic captures file 122. In one implementation, packets that do not carry a payload may be discarded in the calculation of retransmission ratio. For example, these packets that carry no payload may be identified based on their function flags. Thus, line data items including non-zero "SYN" or "ACK" flag may be identified as carrying no payloads and are discarded in the calculation of retransmission ratio.

Network traffic analyzer 104 may calculate a packet retransmission ratio with respect to the pair of the source network node and the destination network node. The ratio may be calculated using a function of RR=RPN/(PN−RPN). Network traffic analyzer 104 may further compare the packet retransmission ratio (RR) to a threshold value (e.g., 2%). If the ratio is greater than the threshold value, the network traffic analyzer 104 may determine that packet losses and the subsequent retransmission are too high and are the cause for low network performance issue between the source network node and the destination network node. The network traffic analyzer 104 may then present, via a user interface, a first message indicating the cause (e.g., "severe packet loss detected between [source IP address] and [destination IP address]") and a second message to suggested technical solutions (e.g., "please move closer to your Wi-Fi access point" or "please check your cable wire").

Figure 3:
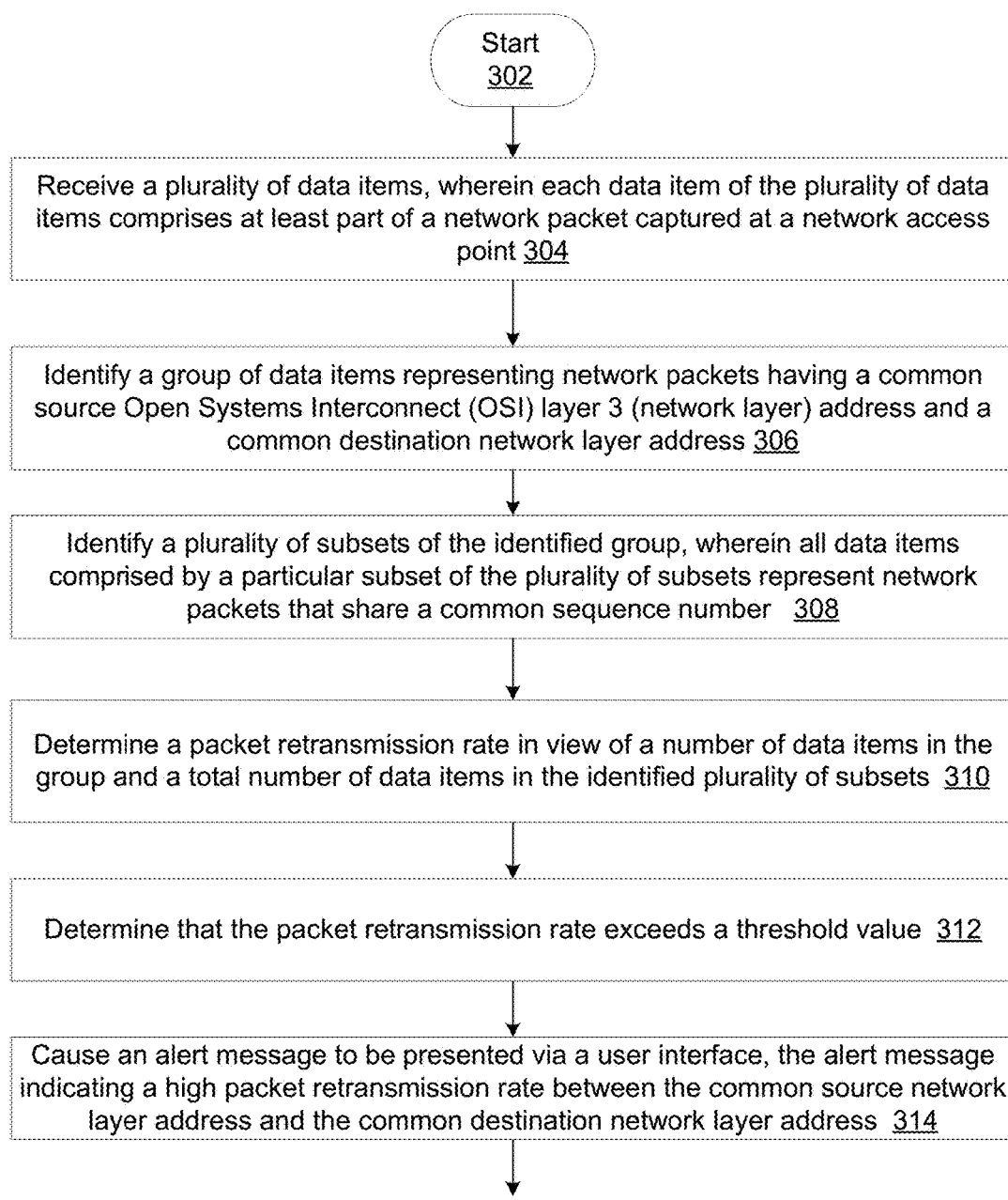
FIG. 3 is a flow diagram illustrating a method 300 to analyze packet transmission data to identify network performance issues according to an implementation of the present disclosure.

FIG. 3 is a flow diagram illustrating a method 300 to analyze packet transmission data to identify network performance issues according to an implementation of the present disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. In one implementation, the methods may be performed by processing device 102 as shown in FIG. 1.

As shown in FIG. 3, at 302, the processing logic may start the process to analyze packet transmission data to determine parameter patterns associated with network performance issues.

At 304, the processing logic may receive a plurality of data items, wherein each data item of the plurality of data items comprises at least part of a network packet captured at a network access point. The data items may be the line data items captured by a capture tool in a network traffic captures file as described in FIG. 2.

At 306, the processing logic may identify a group of data items representing network packets having a common source Open Systems Interconnect (OSI) layer 3 (network layer) address and a common destination network layer address.

At 308, the processing logic may identify a plurality of subsets of the identified group, wherein all data items comprised by a particular subset of the plurality of subsets represent network packets that share a common sequence number.

At 310, the processing logic may determine a packet retransmission rate in view of a number of data items in the group and a total number of data items in the identified plurality of subsets.

At 312, the processing logic may determine that the packet retransmission rate exceeds a threshold value.

At 314, the processing logic may cause an alert message to be presented via a user interface, the alert message indicating a high packet retransmission rate between the common source network layer address and the common destination network layer address.

Figure 4:
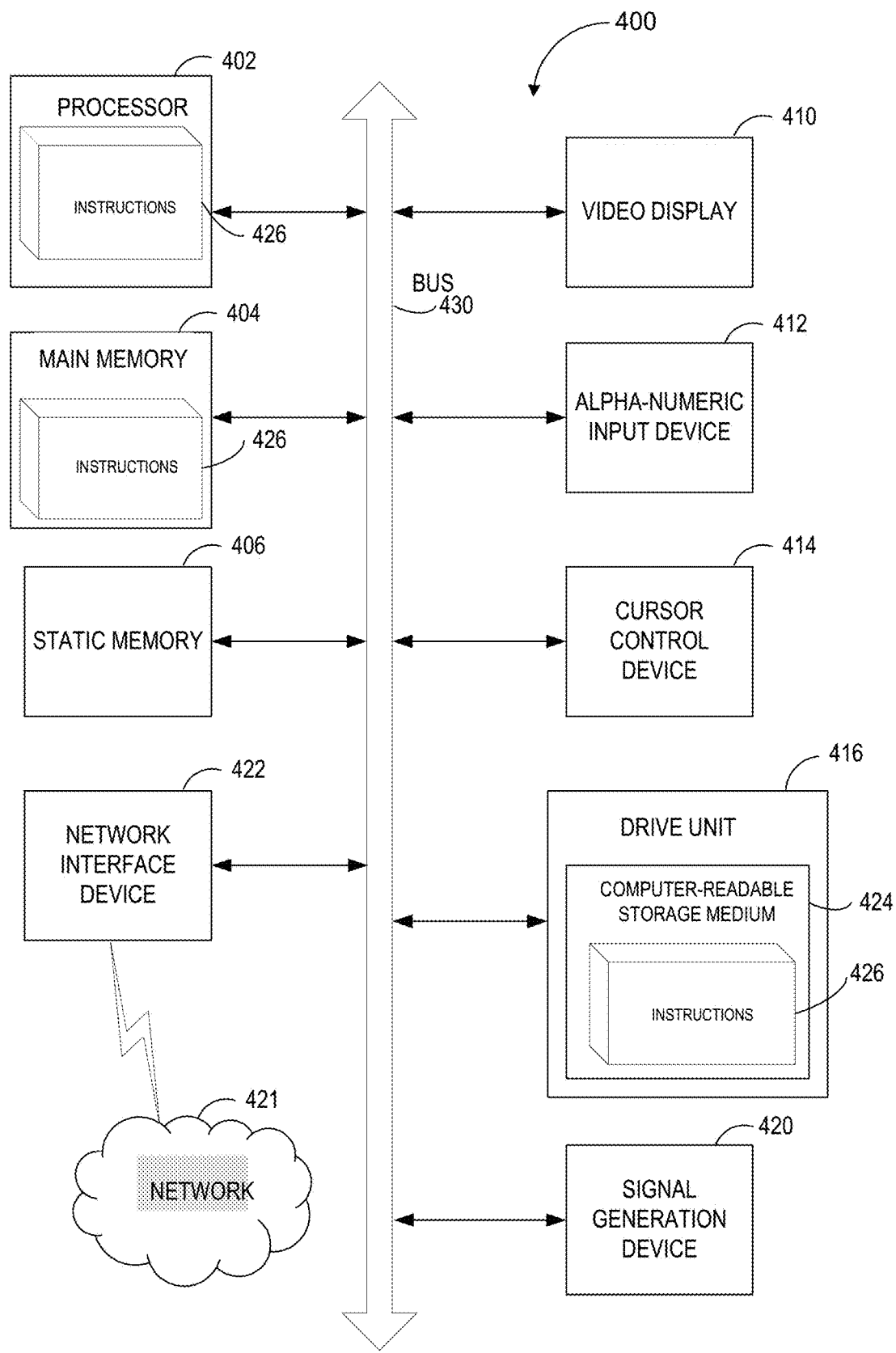
FIG. 4 is a block diagram illustrating an exemplary computer system according to an implementation of the present disclosure.

FIG. 4 illustrates a diagrammatic representation of a machine in the exemplary form of a computer system 400 within which a set of instructions for causing the machine to perform any one or more of the methodologies discussed herein may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD), a cathode ray tube (CRT), or a touch screen), an alphanumeric input device 412 (e.g., a keyboard), a cursor control device 414 (e.g., a mouse), and a signal generation device 420 (e.g., a speaker).

The data storage device 418 may include a computer-readable storage medium 424 on which is stored one or more sets of instructions 426 (e.g., software) embodying any one or more of the methodologies or functions described herein (e.g., instructions of network traffic analyzer 104). The instructions 426 may also reside, completely or at least partially, within the main memory 404 and/or within the processor 402 during execution thereof by the computer system 400, the main memory 404 and the processor 402 also constituting computer-readable storage media. The instructions 426 may further be transmitted or received over a network 474 via the network interface device 422.

While the computer-readable storage medium 424 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "enabling", "identifying," "selecting," "displaying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as 37 example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   receiving, by a processing device, a plurality of data items, wherein each data item of the plurality of data items comprises at least part of a network packet captured at a network access point;
   determining a packet retransmission rate in view of a number of groups of data items representing network packets having a common sequence number, a common source network address associated with a source network node, and a common destination network address associated with a destination network node;
   causing a notification indicative of the packet retransmission rate to be presented via a graphical user interface (GUI); and
   causing a recommendation to be presented via the GUI, wherein the recommendation is related to a network performance issue reflected by the packet retransmission rate.

2. The method of claim 1, wherein the packet retransmission rate is a ratio of a total number of packets retransmitted from the source network address to the destination network address to a difference between a total number of packets transmitted from the source network node to the destination network node and the total number of retransmitted packets.

3. The method of claim 2, wherein the total number of retransmitted packets is represented by the number of groups of data items representing network packets having a common sequence number, a common source network address, and a common destination network address.

4. The method of claim 1, wherein the sequence number represents an ordinal number of a starting data byte of a payload of a corresponding network packet within a current Transmission Control Protocol (TCP) session.

5. The method of claim 1, wherein determining the packet retransmission rate comprises discarding data items that include at least one of a non-zero "SYN" packet function flag or a non-zero "ACK" packet function flag.

6. The method of claim 1, wherein the recommendation identifies a technical solution to reduce the packet retransmission rate.

7. The method of claim 1, wherein the network access point is a networking device associated with the common source IP address, and wherein the networking device comprises one of a computing device, a switch, or a gateway.

8. The method of claim 1, wherein the source network address comprises an Internet Protocol (IP) address and a port number.

9. A non-transitory machine-readable storage medium storing instructions which, when executed by a processing device, cause the processing device to:
   receive a plurality of data items representing network packets captured at a network access point;
   determine an adjustable round-trip time (RTT) threshold in view of a subset of data items representing network packets having a specified source network address associated with a source network node and a specified destination network address associated with a destination network node;
   receive a data item comprising at least part of a network packet having the specified source network address and the specified destination network address;
   responsive to determining that an observed RTT of the network packet is below the adjustable RTT threshold, causing a notification of the RTT be presented via a graphical user interface (GUI)); and cause a recommendation to be presented via the GUI, wherein the recommendation is related to a network performance issue reflected by the packet retransmission rate.

10. The transitory machine-readable storage medium of claim 9, further comprising:
updating the adjustable RTT threshold in view of the observed RTT of the network packet.

11. The transitory machine-readable storage medium of claim 10, wherein the adjustable RTT threshold is equal to a sum of a product of a smoothing factor and the observed RTT of the network packet and a product of a previous value of the adjustable RTT threshold and a difference between one and the smoothing factor.

12. The transitory machine-readable storage medium of claim 9, wherein the notification comprises an information message of a network misconfiguration.

13. A system comprising:
a memory, and
a processing device, communicatively coupled to the memory, to:
receive a plurality of data items, wherein each data item of the plurality of data items comprises at least part of a network packet captured at a network access point;
determine a packet retransmission rate in view of a number of groups of data items representing network packets having a common sequence number associated with a source network node, a common source network address associated with a destination network node, and a common destination network address;
cause a notification indicative of the packet retransmission rate to be presented via a graphical user interface (GUI); and
cause a recommendation to be presented via the GUI, wherein the recommendation is related to a network performance issue reflected by the packet retransmission rate.

14. The system of claim 13, wherein the packet retransmission rate is a ratio of a total number of packets retransmitted from the source network address to the destination network address to a difference between a total number of packets transmitted from the source network node to the destination network node and the total number of retransmitted packets.

15. The system of claim 14, wherein the total number of retransmitted packets is represented by the number of groups of data items representing network packets having a common sequence number, a common source network address, and a common destination network address.

16. The system of claim 13, wherein the sequence number represents an ordinal number of a starting data byte of a payload of a corresponding network packet within a current Transmission Control Protocol (TCP) session.

17. The system of claim 13, wherein determining the packet retransmission rate comprises discarding data items that include at least one of a non-zero "SYN" packet function flag or a non-zero "ACK" packet function flag.

18. The system of claim 13, wherein the recommendation identifies a technical solution to reduce the packet retransmission rate.

19. The system of claim 13, wherein the network access point is a networking device associated with the common source IP address, and wherein the networking device comprises one of a computing device, a switch, or a gateway.

20. The system of claim 13, wherein the source network address comprises an Internet Protocol (IP) address and a port number.

* * * * *